Patented Sept. 26, 1950

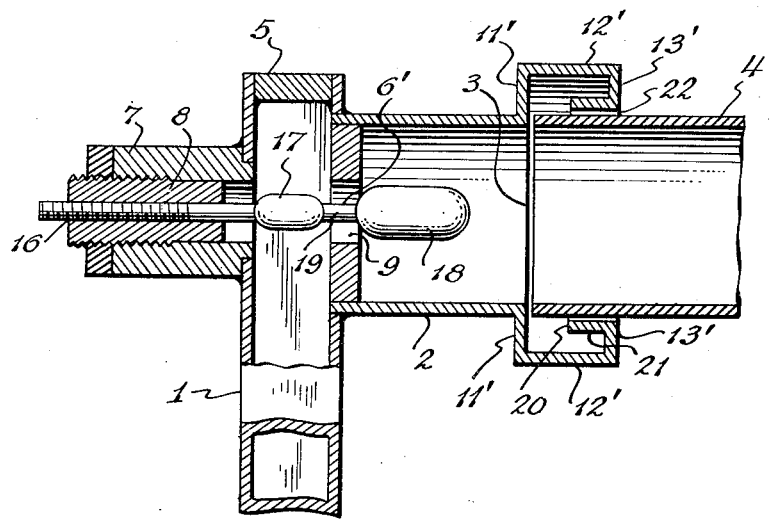

2,523,320

UNITED STATES PATENT OFFICE 2,523,320

COMPACT ULTRA HIGH FREQUENCY ENERGY-CONFINING ROTATING JOINT

Walter W. Mieher, Mineola, and John D. Mallett, Garden City, N. Y., assignors to The Sperry Corporation, a corporation of Delaware Original application June 18, 1942, Serial No. 447,524. Divided and this application April 12, 1946, Serial No. 661,572

10 Claims. (Cl. 178—44)

The present invention relates to the art including ultra high frequency energy translating apparatus and is a division of our copending application Serial No. 447,524, filed June 18, 1942, now U. S. Patent No. 2,407,318, granted September 10, 1946.

In high frequency systems using frequencies of the order of $10^9$ or $10^{10}$ or higher cycles per second it is advantageous to use electromagnetic wave guides for the conduction of high frequency energy. As is well known, such wave guides may have many types of cross-section. However, the rectangular type of wave guide has been found to be highly advantageous because in its lowest mode of excitation, corresponding to the transverse electric or TE mode, high frequency energy is conducted along the wave guide with fixed and definite orientation of the electric field vector, which is termed the polarization. Accordingly, the polarization is exactly determined and may be easily controlled, which is not the usual case with either higher modes of excitation in rectangular wave guides or with other shapes of wave guides. In addition, the rectangular wave guide is easily adapted for the conduction of high frequency energy around corners, since sharp angular bends may be formed in rectangular wave guides using proper designs which create little reflection of energy or mismatching in impedances, and which do not distort the type of field produced within the wave guide.

However, in many applications of such wave guides it is necessary to conduct energy from a stationary member to a rotating member or vice versa, thus requiring the use of suitable rotating wave guide joints. For mechanical reasons these joints must be made with the use of circular cross-section wave guides. Furthermore, if such joints are combined with bends in the circular wave guide, undesirable modulations of the intensity of the energy at the frequency of rotation or harmonics thereof may be produced, as well as undesirable rotations of the direction of polarization with respect to the wave guide, rendering more difficult the problem of efficiently conducting energy down through the wave guide and of controllably utilizing this energy. This is especially true where energy in the transverse electric or TE mode is transmitted through the circular wave guide. Such modulation may be minimized by use of TM or transverse magnetic waves.

The present invention is directed toward improved devices for overcoming these problems. This is done in the present instance by the use of suitable "wave transformers" or "wave converters" which couple a rectangular wave guide excited by TE electromagnetic waves with a circular wave guide excited by electromagnetic waves of the TM type. Such transformers are bilateral in character; that is, energy may be conducted either from the circular to the rectangular guide, or vice versa.

Furthermore, highly efficient low impedance rotating joints are provided for conducting high frequency energy from one member to a second member rotatable with respect thereto, without undesirable modulation of the energy passing thereacross.

In this manner, the desirable characteristics of TE-excited rectangular guides may be used, where energy is to be conducted around corners, the wave converters of the present invention providing simple and efficient means for transforming such energy to TM mode energy in a circular guide for use with the rotating joints of the invention, whereby increased utility and versatility of such wave guide devices may be obtained.

Accordingly, it is an object of the present invention to provide improved rotating joints for wave guides adapted for the efficient transmission of high frequency radiant energy with low losses and substantially no modulation due to relative rotation of the two members of the joint.

It is a further object of the present invention to provide improved means for efficiently coupling high frequency energy between two relatively rotatable conducting means by ensuring a low impedance at the gap of the two conducting means.

Another object is to provide in connection with two high frequency energy juxtaposed conductors a multi-stage circuit for preventing the escape of electromagnetic energy from the gap formed by the abutting ends of the conductors.

Other objects and advantages will become apparent from the specification, taken in connection with the accompanying drawings wherein the invention is embodied in concrete form.

Referring to the drawing, the single figure is an axial cross-sectional view of one form of rectangular-to-round energy transformer, in cooperation with one form of rotating joint.

As described above, the desirability of round wave guides energized by the TM type of wave for use in rotating joints, and of rectangular wave guides energized by TE waves for use in corners and bends, necessitates the use of transformation devices for converting from round to rectangular wave guides and simultaneously from TM to TE waves, and vice versa.

The single figure of the drawing shows an improved form of rectangular-to-round or round-to-rectangular wave guide converting device. In this case, the position of the shorting plug 8 is made adjustable as by threading it into the outer conductor of stub line 7. Any other type of adjustment may be provided. In addition, the antenna 6' is made adjustable as by threading or sliding within a bore 16 formed in plug 8, to obtain maximum energy coupling between rectangular wave guide 1 and circular wave guide 2.

It has been found that more efficient transformation of energy could be obtained by forming antenna 6' of larger diameter, since then a greater surface area is presented for the transmission of the currents along antenna 6', resulting in lower losses. Also, the frequency characteristics of the system are thereby improved, making the system efficiently responsive to a wider range of frequencies. However, it is also desirable to maintain opening 9 as small as possible, to prevent excitation of round wave guide 2 by TE waves, caused by the difference in potential which necessarily exists across opening 9 by virtue of the fact that the potential in the rectangular guide 1 must decrease to zero at the closed short-circuited end 5 of the section.

Accordingly, antenna 6' is formed with two enlarged sections 17 and 18 joined by a smaller section 19 which passes through opening 9, section 18 again being approximately a half wave length long electrically.

This energy converter is extremely flexible in operation since both the tuning of the antenna 6', as by means of plug 8, and the coupling between the two wave guides 2 and 4, as by adjustment of antenna 6' within bore 16, may be independently adjusted.

The energy flowing along rectangular wave guide 1 excites an antenna member 6' positioned transversely of wave guide 1; that is, along the direction of the electric vector of the field within wave guide 1. Electromagnetic waves are thereby induced in antenna 6'. These waves may be strengthened in intensity by suitably tuning the antenna 6', as by coupling thereto a stub short-circuited transmission line 7 whose short circuiting plug 8 is positioned at a point to provide maximum amplitude of induced voltage in antenna 6'. Antenna 6' may also be electrically spaced from the end 5 of wave guide 1 by substantially an odd multiple of a quarter wave length of the operating frequency, measured inside the wave guide, to improve the efficiency of transformation. However, this is not entirely necessary if the antenna 6' is properly designed.

Antenna 6' extends through a suitable opening 9 in the wall of guide 1 and enters the circular wave guide 2, being disposed axially and concentrically thereof. The presence of the induced electromagnetic waves on antenna 6' thereby generates corresponding waves in wave guide 2. By virtue of the axial position of antenna 6', the waves induced in circular wave guide 2 will be of the required TM type, which will then be suitably projected down the length of the wave guide 2. The length of antenna 6' projecting into wave guide 2 is preferably electrically equivalent to substantially a half wave length of the operating frequency.

It is to be understood that this device will also operate in the inverse manner to convert a TM wave in guide 2 to a TE wave in guide 1.

The single figure of the drawing also shows a type of rotating joint. Here flange 11' is shown formed on stationary wave guide 2, although it is clear that it could be formed on rotating wave guide 4 and is made of the same size and wall thickness as wave guide 2 and is placed as closely as possible to the end of wave guide 2 but not in contact therewith. A flange 11' is formed at the end of wave guide 2 to which is connected a concentric sleeve 12' of suitable length terminating at a further flange 13' which has a further sleeve 21 coaxial with wave guide 4 but not in contact therewith.

The length of the sleeve 12' and its inner diameter as well as the length of sleeve 21 are so chosen, with respect to the operating frequency and the outer diameter of wave guide 4, as to present a very low impedance view from the joint 3, whereby joint 3 offers very little attenuation to waves being transmitted along wave guides 2 and 4, and a minimum amount of energy is radiated from gap 22.

Preferably sleeve 12' should be electrically one-half wavelength long. Thus a quarter wavelength coaxial transmission line section, which is open-ended at its end most removed from the joint 3, is formed by a quarter wavelength portion of sleeve 12' extending from flange 11' and the coextensive portion of wave guide 4. The property of this open-ended quarter wavelength section is to transform the impedance existing at the end of this section which is farthest from the joint 3 to an appropriate impedance value at the joint 3. In order to insure the desired low impedance at the joint 3, this quarter wavelength section should have a high impedance load.

To this end, sleeve 21 is substantially a quarter wavelength long at the operating frequency. Thus, sleeve 21 and the coextensive quarter wavelength portion of the sleeve 12' form by virtue of flange 13' a short-circuited quarter wavelength coaxial transmission line section, the input end of which is in series with the open end of the transmission line section adjoining the joint 3. The electrical characteristics of the short-circuited line is to reflect a high impedance at its input end.

It will be noted that the sleeve 12' is formed as a continuation or expanded portion of wave guide 2.

Wave guide 4 and sleeve 21 form a low impedance coaxial or concentric transmission line section which serves to reflect or transform the value of the impedance existing at one end 22 thereof to a different value as seen at the other end, herein designated as 20. The value of the impedance at end 22, in general, corresponds to the radiation impedance which, in turn, may be influenced by diverse factors the effect of which is not readily ascertainable. It is desired, however, that the impedance at joint 3 be of a very low value and substantially independent of any non-ascertainable, unknown, or variable impedance values such as may, from time to time, exist at end 22. This desideratum is accomplished by the means herein provided as will presently appear.

The impedance value existing at end 22, when transformed by means of the transmission line section 4, 21, is effectively in series with the impedance value presented at the open end of the short-circuited coaxial or concentric transmission line section formed by sleeve 21 and sleeve 12'. If, as herein, the length of section 21, 12' is selected to be of electrical length substantially equal to one-quarter wave length, the impedance seen at its opening 20 is of a very high, theoretically infinite, value. Thus it will be seen that the total impedance at end 20, comprising the series connection of this theoretically infinite impedance and the unknown transformed impedance, will be very high. The further section of transmission line comprising wave guide 4 and sleeve 12', which has previously been discussed, is also adjusted or selected so that the impedance existing at end 20 will be reflected at joint 3 as a very low impedance, that is, effectively this transmission line section is also a quarter wave section. It will be clear, however, because of the shape of this transmission line section that the physical length will be less than one-quarter wavelength.

In this way the transformed or reflected impedance at joint 3 will have a very low value upon which the unknown impedance of end 22 will have substantially no effect. It is thus assured that the rotating joint 3 will present a very low impedance to the transmission of high frequency energy therethrough, which impedance will be substantially independent of any unknown factors existing outside the wave guide. Hence, efficient transmission of high frequency energy across the joint is produced.

Although the circular wave guide joint of the single figure of the drawing has been described with respect to relatively rotatable wave guide sections, it will be clear that they can be used equally well for relatively fixed wave guide portions which are not in mutual contact.

Also, the rotating joint described above need not be restricted to circular wave guides, but may be used wherever high frequency energy is to be conducted between relatively rotatable conductors, such as in concentric lines or single tubular lines.

In addition, the wave transformer described above may be used to transfer energy between rectangular wave guides and concentric lines, the antenna member 6' then being an extension of the concentric inner conductor of the line.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A joint for conducting high frequency energy comprising two axially juxtaposed and relatively rotatable coaxial tubular conductor means, resonant coaxial transmission line means coupling the gap between said conductor means and the space exterior of said conductor means for transforming the impedance external to said conductor means to a low series impedance at said gap, said transmission line means including a quarter wavelength coaxial transmission line section, a short-circuited quarter wavelength coaxial transmission line section, and an open-ended quarter wavelength coaxial transmission line section, all of said coaxial line sections being connected in series.

2. A compact and efficient joint for electrically coupling together the ends of two substantially abutting and axially aligned tubular ultra high frequency energy conduits while permitting relative rotation therebetween, comprising an enlarged-diameter conductive continuation of a first one of said energy conduits extending coaxially over the second conduit and forming a first quarter wavelength coaxial transmission line section therewith, the outer conductor of said quarter wavelength section being the inner surface portion of said conductive continuation extending a quarter wavelength from the abutting ends of said conduits and the inner conductor of said quarter wavelength section being the coextensive portion of the outer surface of said second conduit, two further quarter wavelength transmission line sections having their input ends in series between the ends of the conductors of said first quarter wavelength section remote from the abutting ends of said conduits, and means providing an extremely low impedance across the end of one of said further line sections opposite its input end.

3. A joint as defined in claim 2, wherein the second one of said further line sections defines an annular gap open to external space at its end opposite its input end.

4. A joint as defined in claim 2, wherein said enlarged diameter conductive continuation of said first conduit extends a distance of substantially one-half wavelength over said second conduit, and said two further quarter-wavelength transmission line sections comprise a quarter-wavelength sleeve coaxially positioned between said conductive continuation and said second conduit and substantially coextensive with the part of said continuation most remote from said first conduit.

5. A joint as defined in claim 2, wherein said means providing an extremely low impedance across the end of one of said further line sections comprises a conductor web or disc thereacross.

6. A joint as defined in claim 2, wherein said enlarged-diameter conductive continuation of said first conduit extends a distance of substantially one-half wavelength over said second conduit, and said two further quarter wavelength transmission line sections comprise a quarter wavelength sleeve coaxially positioned between said conductive continuation and said second conduit, the ends of said conductive continuation and said sleeve most remote from the abutting ends of said conduits being substantially equidistant from said abutting ends, one of said further quarter wavelength sections comprising the mutually facing coextensive cylindrical surface portions of said conductive continuation and said sleeve and the other of said quarter wavelength sections comprising the mutually facing cylindrical surface portions of said sleeve and said second conduit, and annular disc means connected to the remote end of said sleeve and short-circuiting one of said further quarter-wavelength transmission line sections.

7. A compact and efficient joint for conducting high frequency energy between two coaxially juxtaposed and relatively rotatable coaxial tubular conductors having a narrow gap therebetween comprising a multi-stage circuit means for preventing the escape of electromagnetic energy from said gap, the first stage of said circuit being formed by an expanded diameter continuation of one of said conductors coaxial with said other conductor, a portion of said continuation and said other conductor being equal to a quarter wavelength transmission line section, a second stage including a sleeve coaxial with said conductors and positioned intermediate said other conductor and a further portion of said continuation, said sleeve being short-circuited at one end thereof to form a short-circuited quarter wavelength coaxial transmission line section, the portions of said continuation being continuous to provide a series connection between said first-mentioned quarter wavelength section and said short-circuited quarter wavelength section, whereby said circuit reduces the impedance at said gap to permit an efficient transfer of energy between said conductors.

8. An efficient joint for conducting high frequency energy comprising first and second axially juxtaposed and relatively rotatable coaxial tubular conductor means having a narrow gap therebetween, a substantially electrically quarter wavelength long expanded portion formed on said first conductor means extending coaxially over said second conductor means and forming a quarter wavelength coaxial transmission line section therewith, and a further substantially electrically quarter wavelength long expanded portion formed on said first expanded portion extending coaxially over said second conductor means, said further expanded portion forming the outer conductor of a short-circuited transmission line section, the diameters of both said expanded portions being substantially equal.

9. Ultra high frequency energy conducting apparatus comprising a pair of relatively movable juxtaposed energy conductor means, said conductor means being substantially circular in cross-section with substantially equal diameters, and means for providing a relatively low impedance at the gap between said conductor means to assure relatively efficient transfer of high frequency energy thereacross despite relative motion of said conductors, said means providing a low impedance including an enlarged diameter portion of one of said conductor means extending axially over the other of said conductor means, said portion being substantially electrically a half wavelength long and having a substantially uniform cross-sectional area, a part of said portion forming with the other of said conductor means a quarter wavelength coaxial transmission line section, another part of said portion forming a short-circuited quarter wavelength transmission line section.

10. Ultra high frequency energy conducting apparatus comprising a pair of relatively movable juxtaposed energy conductor means, and means including a short-circuited quarter wavelength coaxial transmission line section for providing a relatively low impedance at the gap between said conductor means to assure a relatively efficient transfer of high frequency energy thereacross despite relative motion of said conductor means; said means for providing a relatively low impedance comprising a first sleeve fixed to one of said conductor means concentrical therewith and extending over the other of said conductor means for a half wavelength, a quarter wavelength portion of said first sleeve and the coextensive portion of said other conductor means forming an open-ended quarter wavelength section, a second sleeve carried by and within said first sleeve and outwardly of said other conductor means and extending from the end of said first sleeve most remote from said gap a distance of substantially a quarter wavelength to partially provide said short-circuited section, the distance between the end of said second sleeve nearest said gap and said gap being electrically equivalent to a quarter wavelength, whereby said sleeves serve to reduce the impedance at said gap between said conductor means to a low value substantially independent of conditions external to said conductor means.

WALTER W. MIEHER.
JOHN D. MALLETT.

REFERENCES CITED

The following references are of record in the file of this patent:

UNITED STATES PATENTS

| Number | Name | Date |
|---|---|---|
| 2,322,971 | Roosenstein | July 29, 1943 |
| 2,351,895 | Allerding | June 20, 1944 |
| 2,364,526 | Hansell | Dec. 5, 1944 |
| 2,401,344 | Espley | June 4, 1946 |
| 2,402,540 | Espley | June 25, 1946 |
| 2,404,542 | Sloan | July 23, 1946 |
| 2,407,318 | Mieher | Sept. 10, 1946 |
| 2,425,345 | Ring | Aug. 12, 1947 |
| 2,426,226 | Labin | Aug. 26, 1947 |
| 2,434,925 | Haxby | Jan. 27, 1948 |